Oct. 22, 1968     H. L. PETERSON     3,407,283
ICE FISHING HOLE HEATING DEVICE
Filed Oct. 22, 1965
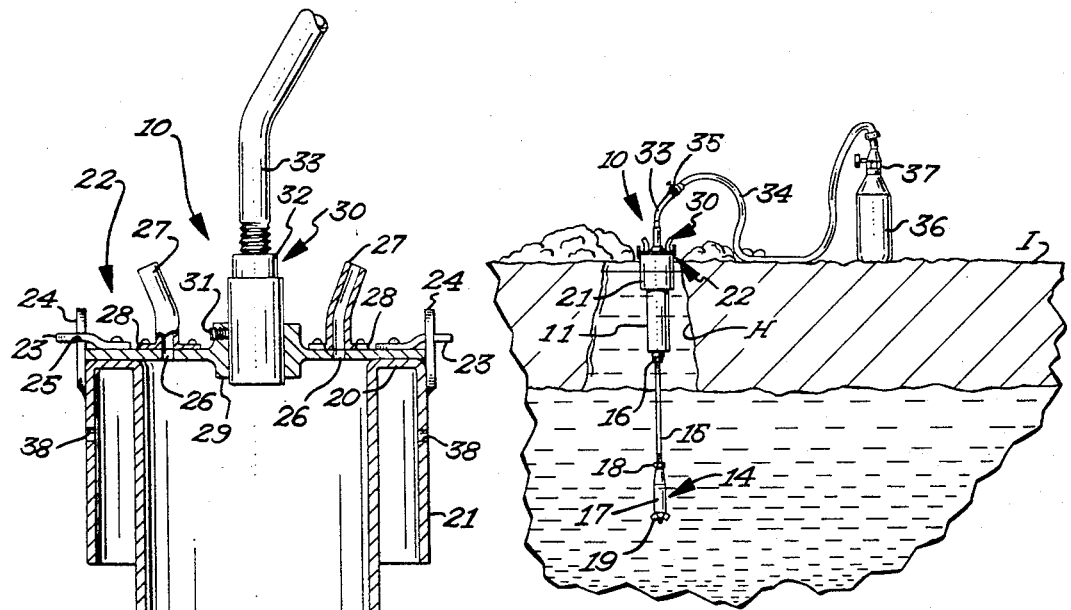
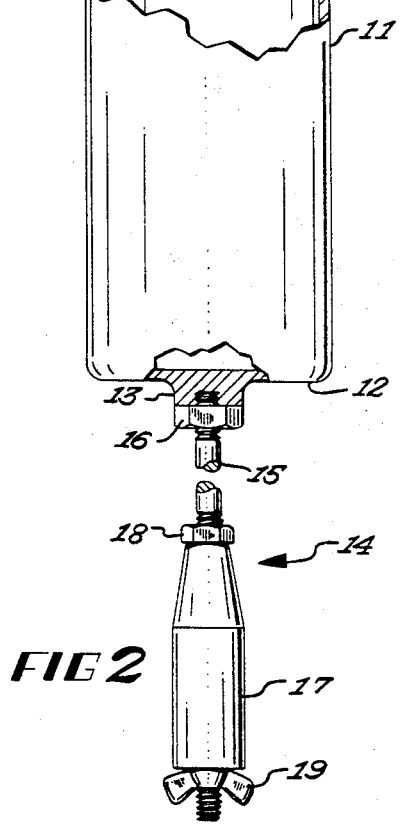
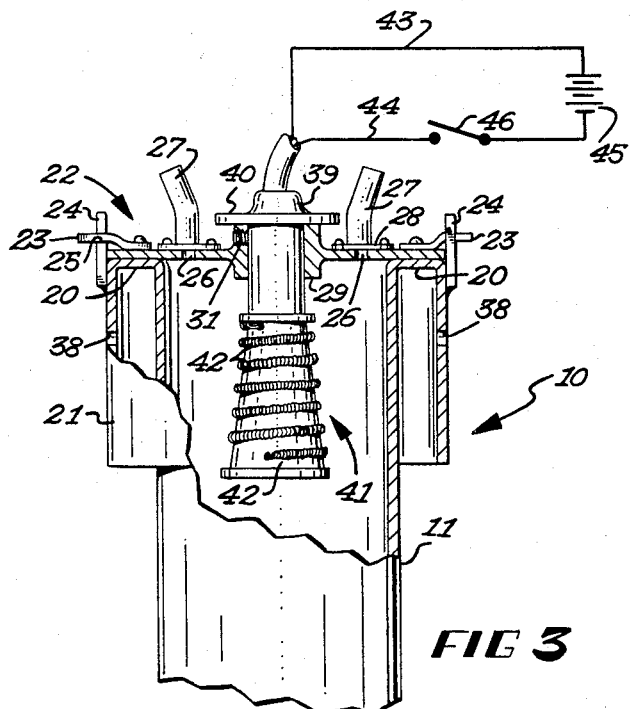
INVENTOR.
HARRY L. PETERSON
BY
Williamson & Palmatier
ATTORNEYS

United States Patent Office 3,407,283
Patented Oct. 22, 1968

3,407,283
ICE FISHING HOLE HEATING DEVICE
Harry L. Peterson, Minneapolis, Minn., assignor to
Charles P. McManus, Duluth, Minn.
Filed Oct. 22, 1965, Ser. No. 501,335
4 Claims. (Cl. 219—317)

ABSTRACT OF THE DISCLOSURE

A heating device for preventing ice fishing holes from freezing has a hollow cylindrical buoyant member having a closed bottom end and a top end provided with a removable closure member. The closure member carries a heating mechanism in the form of either an electric heating element or a gaseous fuel burner. The heating mechanism extends into the buoyant member and heats the walls and interior thereof. An annular heat transfer sleeve is supported in spaced relation to the upper end of the buoyant member to define a downwardly open annular passage therebetween. An elongated stabilizing weight is suspended from the bottom end of the buoyant member.

---

A floating heating device for maintaining an ice fishing hole in an open condition. The heating device including a cover member on which a heating mechanism is mounted so that the heating mechanism is protected by the cover and a cylindrical hollow buoyant heating member. The cylindrical heating member having an outturned flange receiving heat from the heating mechanism through the upper wall portion of the heating member and from the cover member. A sleeve depending from the outturned annular flange receiving heat by conduction from said flange and heating the surface of the water to prevent freezing of the water surface. The heat exchange action between the heating device and water being such that the water adjacent the device is kept from heating but preventing the exposed portion of the heating device from becoming overheated so that a fishing line coming in contact with the heating device will not be burned or damaged.

This invention relates to a heating device for preventing ice fishing holes from freezing.

An object of this invention is to provide a novel and improved heating device, of simple and inexpensive construction, which may be positioned in the water of an ice fishing hole to float therein and which is operable to prevent the water from freezing and to maintain the hole in open condition.

A more specific object of this invention is a provision of a buoyant floatable heating device to be positioned within an ice fishing hole including a heating member and cover therefore, the latter having a heating mechanism thereon to heat all of the wall surfaces of the heating device and the surrounding water to prevent the latter from freezing.

These and other objects and advantages of the invention will more fully appear from the following description made in connection with the accompanying drawings, wherein like character reference refer to the same or similar parts throughout the several views, and in which:

FIG. 1 is a side elevational view illustrating the heating device in use,

FIG. 2 is a side elevational view of the heating device on an enlarged scale with parts thereof broken away and other parts thereof foreshortened for clarity, and FIG. 3 is a fragmentary side elevational view of a modified form of the heating device with parts thereof broken away for clarity.

Referring now to the drawings and more specifically to FIGS. 1 and 2 it will be seen that one embodiment of the novel heating device designated generally by the reference numeral 10 is thereshown. The heating device 10 includes a generally cylindrically shaped heating member 11 formed of a suitable metallic material, such as aluminum or the like, and which is of imperforate configuration having a closed lower end 12, and an open upper end.

The exterior surface of the closed lower end 12 has an embossment 13 integrally formed therewith, centrally thereof and projecting downwardly therefrom. This embossment 13 has a threaded recess therein. A stabilizing mechanism 14 is provided and includes an elongate stabilizing rod 15 which has opposite ends thereof threaded, the upper most end being threadedly engaged in the threaded socket of the embossment 13. A lock nut 16 locks the rod 15 against rotation with respect to the threaded recess of the embossment 13. An elongate weight member 17 having a bore therethrough receives the lower end portion of the stabilizing rod 15 therethrough and is adjustably positioned thereon between a positioning nut 18 and a wing nut 19 as best seen in FIG. 2. The stabilizing mechanism as best seen in FIG. 1 stabilizes and orients the heating member 11 in an upright position when the latter is placed in the water of an ice fishing hole.

The upper end of the heating member 11 has an outturned annular flange 20 integrally formed therewith and a cylindrically shaped heat transfer sleeve is integrally formed with the outer periphery of the annular flange 20. It will be noted that the heat transfer sleeve 21 is disposed in outwardly spaced concentrically relation with respect to the heating member 11. It will also be noted that the lower end of the heat transfer sleeve 21 is disposed substantially above the mid point of the heating member 11.

A generally flat cover member 22 engages the upper surface of the outturned annular flange 20 to close the open upper end of the heating member 11. This cover or closure member 22 is also formed of a suitable metallic material and is provided with a pair of locking elements 23 affixed to the upper surface thereof by suitable bolts or the like and projecting radially outwardly from opposite side portions thereof. These locking elements 23 each engage one of a pair of cooperating locking elements 24 affixed to the exterior surface of the heat transfer sleeve 21 adjacent opposite sides thereof and projecting vertically upwardly therefrom. These locking elements 24 are each provided with oppositely facing slots 25 whereby when the cover member 22 is positioned upon the heating member 11 and rotated, the locking elements 23 will be moved into the slots of the locking elements 24. The cover or closure member may be released therefrom by rotating the closure member in the opposite direction.

The cover member 22 also has a pair of vent openings 26 therein and a pair of angularly bend tubes 27 are each disposed in communicating relation with one of the vent openings 26. Each of these bend tubes 27 is provided with an outturned annular flange 28 provided with suitable apertures to permit attachment of the same to the upper surface of the cover member 22 by suitable securing means such as bolts.

The cover member 22 is also provided with a centrally located axially extending heater receiving sleeve 29 integrally formed therewith as best seen in FIG. 2. A generally cylindrically shaped heater mechanism 30 is positioned within the receiving sleeve 29 and is releasably locked against movement relative thereto by a suitable set screw 31 which engages a threaded recess in the sleeve 29. It will be noted that when the heater mechanism 30 is positioned within the receiving sleeve 29, one end thereof projects into the interior of the heating member 11 and this lower end of the heater mechanism is provided with a plurality of burning orifices therein which are arranged in circular fashion in a well known manner. The heater mechanism 30 illustrated in the embodiments of FIGS. 1 and 2 is of the conventional gas burner type for burning a suitable gaseous fuel.

To this end, it will be noted that the upper end of the heater or burner mechanism 30 is provided with an internally threaded socket member 32 for threaded reception of one end of an elongate angularly bend rigid conduit 33 which is formed of a suitable metallic material. The other end of the conduit 33 is connected in communicating relation to one end of a flexible conduit 34 by means of a suitable clamping mechanism 35.

The other end of the flexible conduit 34 is connected in communicating relation to a metallic container 36 which contains a predetermined volume of gaseous fuel under pressure such as propane. The container 36 is provided with a suitable valve mechanism 37 of well known construction whereby the flow of fuel gas under pressure such as propane within the bottle or container 36 may be readily adjusted.

In use, the cover member 22 will be removed from the heating member 11 and the heater or burner mechanism 30 will be ignited, and the cover will thereafter be secured to the open end of the heating member 11 to close the same in sealing relation with respect to the interior. The vent tubes 27 serve to vent off unburned gases from the interior of the heating member 11. The heating device is then placed in the water of an ice fishing hole H formed in a layer of ice I as best seen in FIG. 1. The heating member will be vertically oriented in the water by the stabilizing action produced by the stabilizing mechanism 14. Although the heating device 10 is buoyant and will float, only the upper portion thereof will be disposed above the surface of the water and it will be noted that the heat transfer sleeve 21 will also be partially immersed in the water. It will be noted that the heat transfer sleeve 21 is provided with a pair of air vent openings 38 therein to permit some of the air trapped therein to escape therethrough when the heating device is positioned within the water.

The heater or burner mechanism 30 will quickly heat the interior of the heating member 11 so that the walls thereof will keep the surrounding water in a heated condition to prevent the same from freezing. The heater mechanism 30 also causes the cover member 22 to become heated and the heat from the cover member 22 as well as the cylindrical wall of the heating member 11 will be transfered by conduction through the annular flange 20 to the heat transfer sleeve 21 to heat the surrounding water adjacent thereto.

The heat exchange action produced by the heat transfer sleeve 21 also tends to prevent the cover 22 from over heating so that the cover may be readily handled. It will be noted that the heating device 10 is substantially smaller than the conventional ice fishing hole and permits a fisherman to fish while the heating device 10 is floating in the water of the fishing hole. To this end, it is pointed out that the cover member 22 as well as the heat transfer sleeve 21 although mantained in a warm condition are not sufficiently hot enough to cause damage to the conventional flexible plastic fishing lines even if such lines come in contact therewith. The angulated rigid conduit 33 also serves as a carrying handle for the device when it is desirable to transfer the heating device from one location to another. The angulated construction of the vent tubes 27 minimize the tendancy of these tubes to become clogged by snow during use of the heating device. By having the heater or burning mechanism affixed to the cover member 22 also allows the burner to be ignited prior to closing the heating device to minimize any tendency of explosions and the like.

Reference is now made to FIG. 3 wherein the modified form of the heating device is shown. The modification of this heating device shown in FIG. 3, however, lies only in the heater mechanism, per se, and the heating device is therefore identical in construction to that shown in FIGS. 1 and 2. Thus the heating device 10 of FIG. 3 includes a heating member 11 having a lower closed end, an open upper end with an annular flange integrally formed therewith and a heat transfer sleeve depending therefrom. The latter is also provided with openings 38 and the cover member 22 is also of identical construction as that shown in FIG. 1. The heater receiving sleeve 29 receives a suitable heat resistant electrical ceramic female socket member 39 therein provided with a suitable radially extending flange 40 which engages the upper axial end of the receiving sleeve 29. The female socket member 39 threadedly receives the male socket element of an elongate electrical resistance heating mechanism 41. This heating mechanism 41 includes a generally frusto-conical shape ceramic mounting member 42 to which the male socket element is secured (not shown) and having resistance heating coils 42 wound there around which are connected to the contacts of the male electrical socket element in a well known manner. Electrical conductors 43 and 44 connect the heating mechanism 41 to a suitable source of electrical current such as an automobile battery 45 or the like. A manually operable control switch 46 may also be provided in the circuit of the heater mechanism 41 as best seen in FIG. 3 to permit the heating mechanism to be selectively energized and de-energized.

The action of the heating mechanism 41 with respect to the heating member 10 and the cover member 42 is identical to that of the embodiment of FIGS. 1 and 2 and when the heating mechanism is energized and the heating device is placed in water of the ice fishing hole, the water will be heated and the ice fishing hole will be prevented from freezing. It is pointed out that suitable seal means such as a gasket or the like may be interposed between the upper surface of the annular flange 20 and the lower surface of the cover member 22 to provide a seal thereat. This would seal the interior of the heating member 11 from the exterior except for the vent tubes 27.

From the foregoing it will be seen that I have provided a novel heating device, which is not only of simple and inexpensive construction, but one which is highly effective in preventing freezing of the water in an ice fishing hole.

It will, course, be understood that various changes may be made in the form, details, arrangement and proportions of the various parts without departing from the scope of my invention.

I claim:
1. A heating device for preventing freezing of the ice fishing holes, said device comprising,
   an elongate generally cylindrically shaped hollow imperforate floatable heating member having a closed lower end and an open upper end, adapted to be positioned in the water of an ice fishing hole to float in upright relation therein with only the upper portion thereof located above the surface of the water, said heating member having an outturned annular flange integrally formed with the upper end thereof,
   a sleeve integrally formed with the outer periphery of said flange and depending therefrom, and defining with said heating member a downwardly opening annular passage between said sleeve and heating member, said sleeve having its lower end spaced above the transverse axis of the heating member, said sleeve being partially immersed when said heating member is positioned in the water,
   a closure member engaging the upper end of said heating member to close the same and engaging said outturned annular flange,
   cooperating interengaging locking elements on said members for permitting said closure member to be releasably locked on said heating member,
   a heating mechanism on said closure member and extending into said heating member adjacent the upper end thereof, said heating mechanism being operable to primarily heat the interior and upper portion of the walls of said heating member and said closure member, so that heat is transferred by conduction from the upper wall portion of said heating member and from said closure member to the outturned annular flange and to said sleeve to heat the surface of the water, and a stabilizing member secured to and depending from the closed end of said heating member to orient the latter in an upright position and to at least partially immerse the heating member so that the sleeve thereof extends downwardly into the water.

2. The heating device as defined in claim 1 wherein said heating mechanism comprises a gas heating mechanism connectable to a source of combustible gas under pressure, said cover member being positioned upon said outturned annular flange and extending to the periphery of the latter.

3. The heating device as defined in claim 1 wherein said heating mechanism comprises an electrical resistance heating mechanism having electrical conductors connected thereto and being connectable to a source of electrical current.

4. The heating device as defined in claim 1 wherein said cover member has a vent opening therein, and an elongate vent tube having one end thereof mounted on said cover member and communicating with said vent opening, said vent tube extending upwardly from the cover member so that the other end thereof is spaced above the cover member to intercommunicate the interior of said heating member with the exterior.

References Cited

UNITED STATES PATENTS

| | | | |
|---|---|---|---|
| 593,047 | 11/1897 | Dorsey | 126—360 |
| 1,073,687 | 9/1913 | Jensen | 126—360 |
| 1,248,850 | 12/1917 | Hartman | 9—8.3 |
| 2,514,559 | 7/1950 | Riemenschneider | 219—317 |
| 3,194,229 | 7/1965 | Borgeson | 126—360 |

FOREIGN PATENTS

| | | |
|---|---|---|
| 869,855 | 11/1941 | France. |
| 84,209 | 4/1920 | Switzerland. |

ANTHONY BARTIS, *Primary Examiner.*